US005568933A

United States Patent [19]

Mizuno

[11] Patent Number: 5,568,933

[45] Date of Patent: Oct. 29, 1996

[54] FOLDABLE WHEELCHAIR

[75] Inventor: Jiro Mizuno, Tokyo, Japan

[73] Assignee: Labor Savings Machine Co., Ltd., Tokyo, Japan

[21] Appl. No.: 343,230

[22] Filed: Nov. 22, 1994

[51] Int. Cl.$^6$ ................................ B62B 7/06; B62M 1/14

[52] U.S. Cl. ............................ 280/42; 280/647; 280/650; 280/43.14; 280/43.24; 280/767; 280/250.1; 297/44; 297/338

[58] Field of Search .................................... 280/647, 650, 280/657, 250.1, 43.14, 43.22, 43.24, 47.4, 47.41, 764.1, 767, 42; 297/44, 338, DIG. 4

[56] References Cited

U.S. PATENT DOCUMENTS

| | | | |
|---|---|---|---|
| 2,783,055 | 2/1957 | Michaud | 280/43.14 |
| 3,833,256 | 9/1974 | Dehner | 297/44 |
| 4,500,109 | 2/1985 | Volin | 297/338 X |
| 4,648,615 | 3/1987 | Volin | 280/42 X |
| 5,137,295 | 8/1992 | Peek | 280/250.1 X |
| 5,201,377 | 4/1993 | Wilson | 280/657 X |
| 5,224,731 | 7/1993 | Johnson | 280/648 |
| 5,244,222 | 9/1993 | Benoit | 280/647 X |
| 5,255,934 | 10/1993 | Wilson | 280/657 |
| 5,437,497 | 8/1995 | Hutson | 280/250.1 X |

*Primary Examiner*—Brian L. Johnson
*Attorney, Agent, or Firm*—Cobrin Gittes & Samuel

[57] ABSTRACT

A wheelchair is made up of a pair of parallel main frames connected to each other on the rear side via a detachable back supporter and on the front side via footplates foldable along a center hinge extending in the longitudinal direction. Large wheels and a seat plate are detachably coupled to the main frames. The seat plate is changeable in level by leverage operation. After detachment of the large wheels, and unlocking of the back supporter, the wheelchair can approach very close to a user lying on a bed. When the large wheels are detached, the wheelchair can go through doors of ordinary sizes. By folding the foot plates together, the main frames can be put together side by side for convenience in transportation.

6 Claims, 7 Drawing Sheets

FOLDABLE WHEELCHAIR

BACKGROUND OF THE INVENTION

The present invention relates to a foldable wheelchair, and more particularly relates to improvement in operability and transferability of a wheelchair.

In the following description, the phrase "a user" refers to a person such as a sick patient, an elderly or a bodily crippled person who needs to use a wheelchair for travel between two distant spots.

Further, a term "longitudinal direction" refers to a horizontal direction extending front to rear on a wheelchair whereas a term "lateral direction" refers to a horizontal direction substantially perpendicular to the longitudinal direction.

A conventional wheelchair includes a pair of main frames spaced in the lateral direction by two or more transverse bars. The rear side of the wheelchair is closed by a back upholstery spanning upright pole sections of the main frames. A pair of large wheels are coupled to both lateral sides of the main frames. A pair of casters are also coupled to the main frames on the front sides of the associated large wheels. A pair of footplates are attached to the front lower ends of the main frames in a side-by-side arrangement whilst projecting forwards.

For movement of a wheelchair, its user may rotate the large wheels via push rims attached to the large wheels. Alternatively, a helper may push the wheelchair via handgrips attached to the back upholstery.

In either case, the relatively rigid construction of a wheelchair and presence of large wheels cause many inconveniencies in actual use of the wheelchair.

First, due to presence of the transverse bars spanning two main frames, it is almost impossible to bring the wheelchair as close as possible to the position of a user lying on a bed. So, for transfer of a user between a wheelchair and a bed, two or more helpers need to carry the user manually. This manual transfer not only poses much load on the helpers but, depending on the body condition of the user, causes much physical pain to the user.

Second, due to the presence of the two large wheels projecting sideways from the main frame, a wheelchair can go through only a toiled door or a bath door which is designed specially broad enough to allow its passage. Here again, the user needs assistance by two or more helpers.

The relatively rigid construction and presence of various accessories such as footplates make a wheelchair very unwieldy and such an unwieldy construction causes troublesome transportation of a wheelchair.

SUMMARY OF THE INVENTION

It is the basic object of the present invention to enable close approach of a wheelchair to a user lying on a bed.

It is another object of the present invention to enable free passage of a wheelchair even through an ordinary door which is not specially designed for wheelchairs.

It is the other object of the present invention to provide a wheelchair well suited for transportation.

In accordance with the present invention a pair of main frames extend in a longitudinal direction of a wheelchair, a back supporter extends in a lateral direction to detachably connect the main frames together at their upper ends, a lifter unit includes a pair of lifter shafts axially turnably by the respective main frames and a pair of lifter arms coupled to the respective lifter shafts to enable manual turning of the lifter shafts, a seat unit includes a seatplate which is detachably suspended by the lifter shafts, a pair of large wheels are detachably coupled to the respective main frames, a foot unit coupled to the front lower ends of the main frames includes a pair of footplates united together along a center hinge extending in the longitudinal direction, and a pair of caster units are coupled to the rear lower ends of the main frame whilst each including a caster and a Jack lever for lifting the caster from the floor level.

DESCRIPTION OF THE PREFERRED EMBODIMENTS

Figure 1:
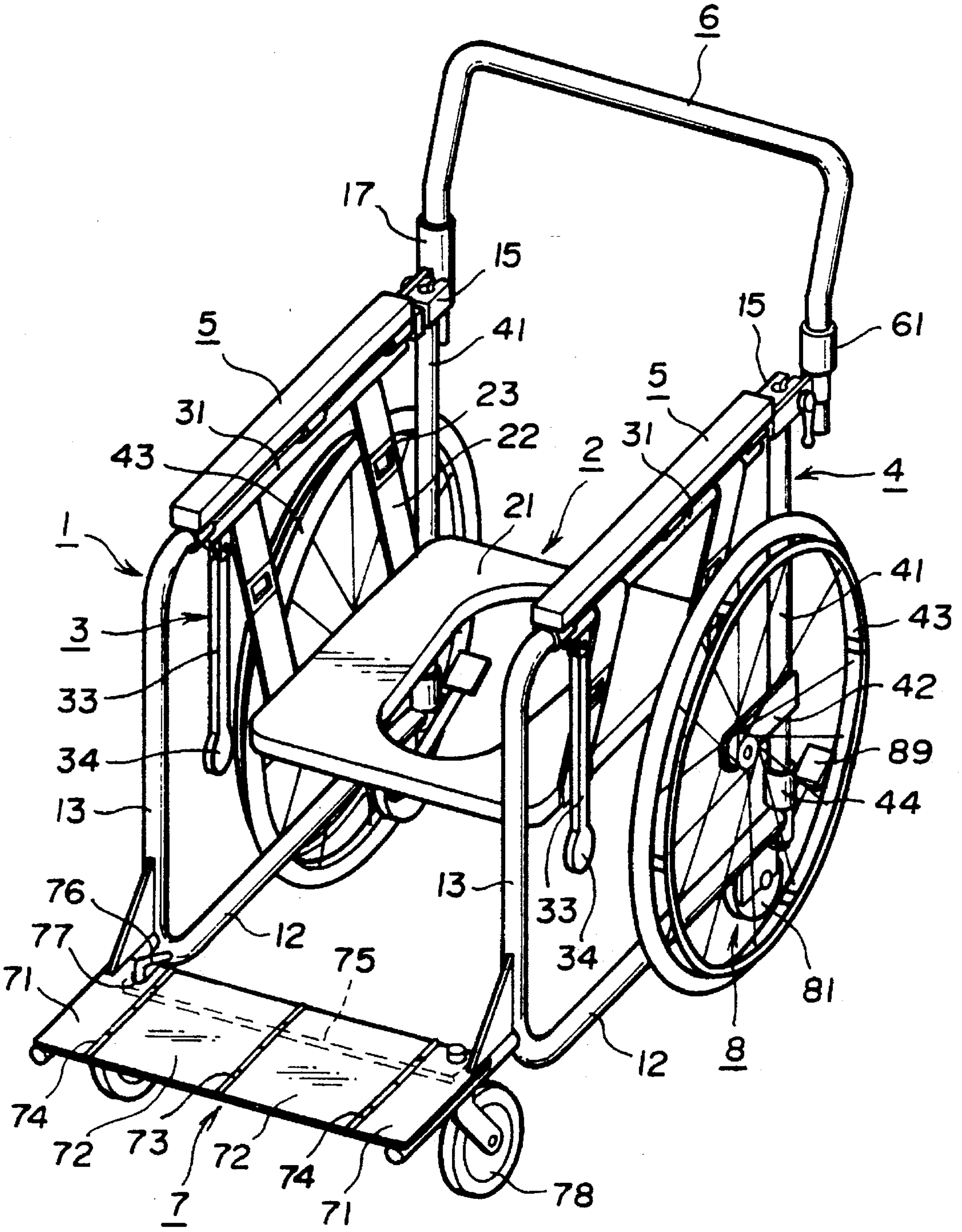
FIG. 1 is a perspective view of one embodiment of the foldable wheelchair in accordance with the present invention in the fully assembled state.

A basic embodiment of the foldable wheelchair in accordance with the present invention is shown in FIGS. 1 through 4. As major components, the wheelchair includes a pair, of main frames 1 extending in the longitudinal direction, a back supporter 6 detachably connecting the main frames 1 at their rear upper ends, a seat unit 2 including a seat plate 21, a lifter unit 3 detachably suspending the seat plate 21 from the main frame 1, a pair of large wheel units 4 detachably coupling large wheels 43 to the main frames 1, a foldable foot unit 7 coupled to the front lower ends of the main frames 1, and a pair of caster units 8 coupled to the rear lower ends of the main frames 1.

Figure 2:
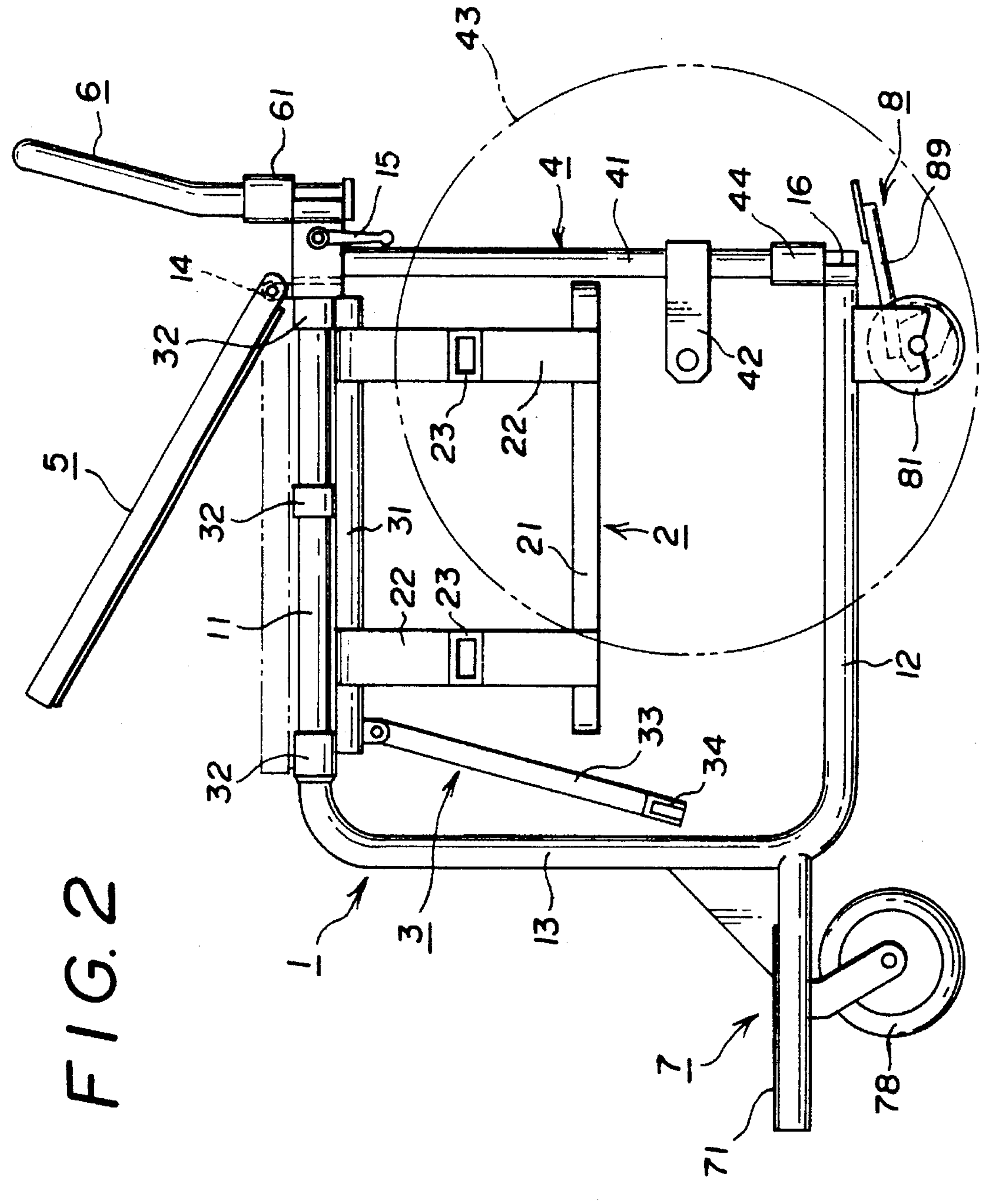
FIG. 2 is a side view of the foldable wheelchair.

As best seen in FIG. 2, each main frame 1 is made up of a horizontal upper frame 11, a horizontal lower frame 12 and a vertical front frame 13, all connected in one body to each other. The rear side of the main frame i is left open. This rear open construction of the main frame 1 is very important for close approach of the wheelchair to a bed on which its user is lying. Near the rear end, the upper frame 11 is provided with an armrest stand 14 and an upper lock 15 for the large wheel unit 4. Further on the rear side, the upper frame 11 is provided with a back support stand 17. Likewise, near the rear end, the lower frame 12 is provided with a lower lock 16 for the large wheel unit 4.

The lifter unit 3 includes a pair of lifter shafts 31 each extending in parallel to an associated upper frame 11 of the main frame 1. More specifically, each lifter shaft 31 is held by the associated upper frame 11 via a plurality of bosses 32 which are idly inserted over the upper frame 11. Stated otherwise, the lifter shaft 31 is turnable about the axis of the upper frame 11. At the front end, each lifter shaft 31 is associated with a lifter arm 33 radially connected thereto. Thus, when the lifter arm 33 is manually swung in a vertical plane normal to the longitudinal direction, an associated lifter shaft 31 turn about the axis of the upper frame 11. At distal ends, the pair of lifter arms 33 are provided with buckles 34 for mutual end connection.

Figure 3:
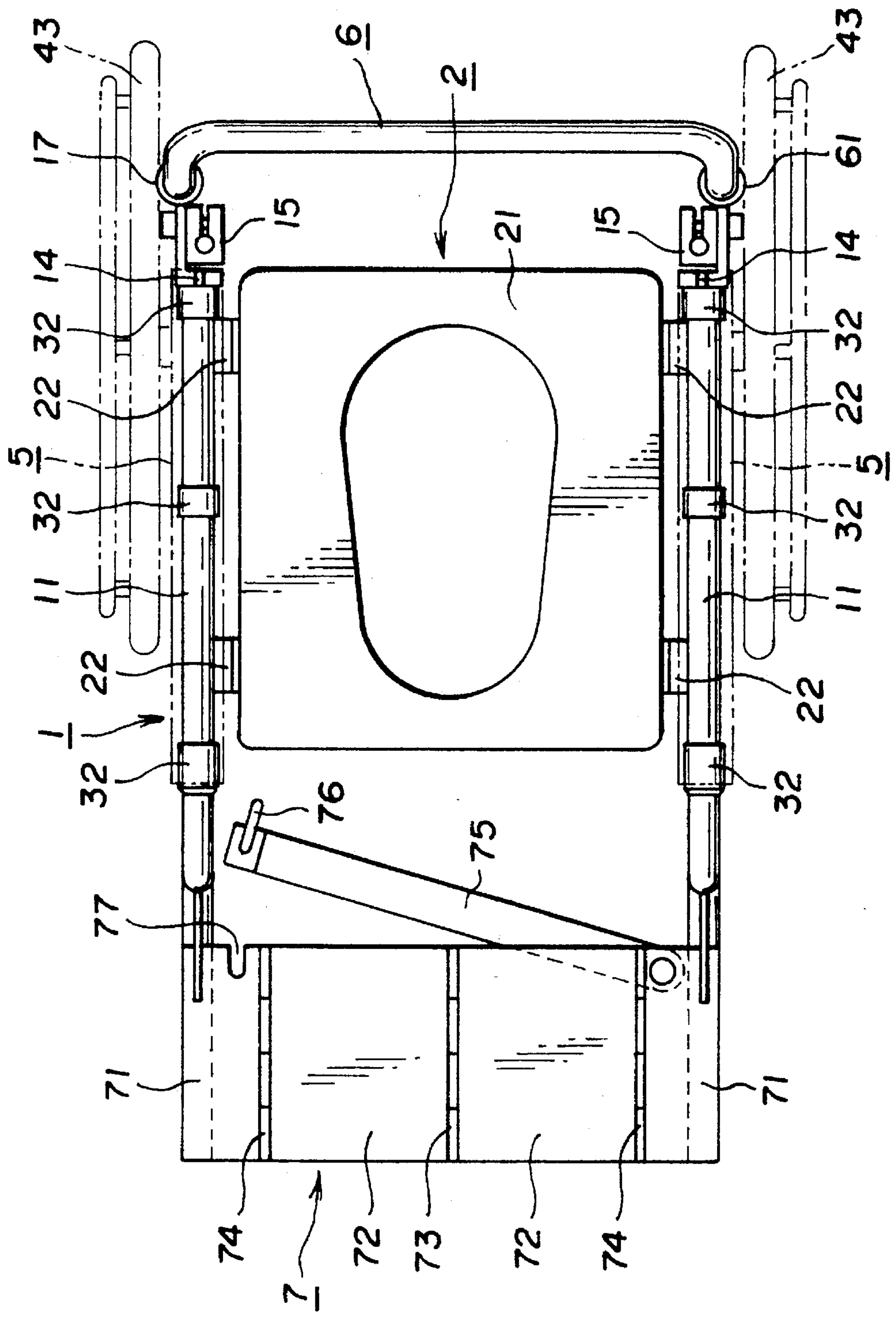
FIG. 3 is a top plane view of the foldable wheelchair.
Figure 4:
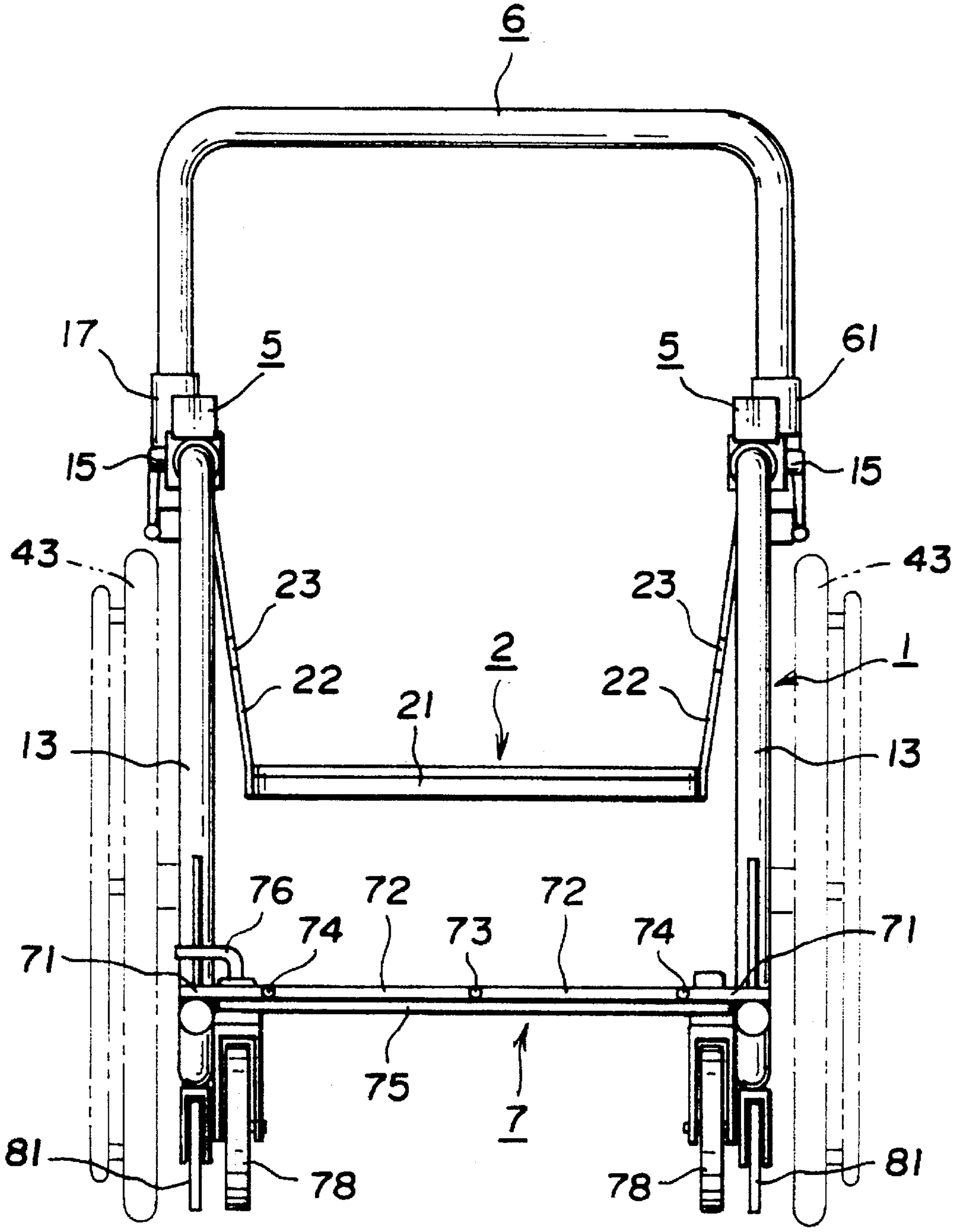
FIG. 4 is a fragmentary front view of the foldable wheelchair.

As seen in FIGS. 2 and 3, the seat unit 2 includes a flat seat plate 21 preferably provided with a center opening. Near four corners, the seat plate 21 is connected to the lifter shafts 31 of the lifter unit 3 via suspension belts 22. Each suspension belt 22 is provided with a midway buckle 23 so that the seat plate 21 can be detached from the lifter unit 3 by disengaging the buckles 23. The system is adjusted so that, when the seat plate 21 rest at its lower position without lifting by the lifter unit 3, the seat plate 21 should be located at the level of ordinary western style toilet basin.

Figure 5:
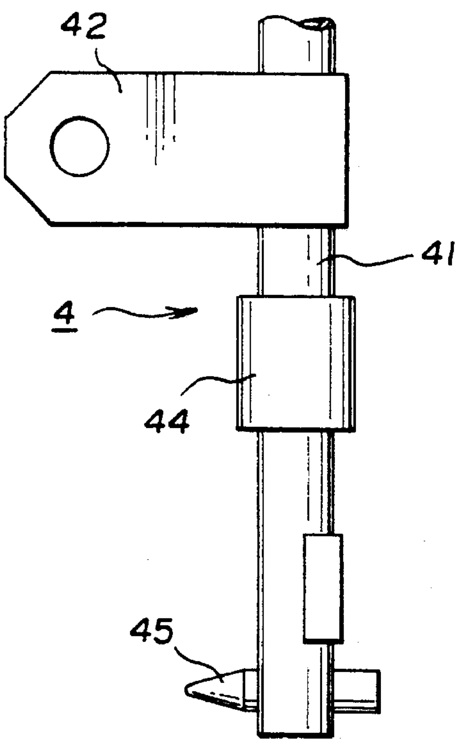
FIG. 5 is an enlarged side view of the large wheel unit used for the wheelchair shown in FIG. 1.

Each large wheel unit 4 includes a rim shaft 41 (see FIG. 5). The rim shaft 41 is provided at midway with a wheel bracket 42 which extends forwards in order to carry a large wheel 42. Below the wheel bracket 42, a lock sleeve 44 is idly inserted over the rim shaft 41. At the lower end, the rim shaft 41 is provided with a lock pin 45 extending forward. At the upper end, the rim shaft 41 is detachably coupled to the rear end of the upper frame 11 of the main frame 1 by assistance of the upper lock 15. Whereas, at the lower end, the rim shaft 41 is also detachably coupled to the rear end of the lower frame 12 of the main frame 1 by assistance of the lower lock 16, the lock pin 45 and the lock sleeve 44. Thus when unlocked at the upper and lower ends, the rim shafts 41 can be detached from associated main frames 1 together with the large wheels 43.

On each main frame 1, an armrest 5 is preferably pivoted at its rear end to the armrest stand 14 on the upper frame 11 so that it covers the upper frame 11 and the bosses 32 in its lower position. The armrest 5 is swung upwards in order to allow free turning of the lifter shaft 31 about the axis of the associated upper frame 11.

A curved back supporter 6 spans the rear upper ends of the main frames 1. More specifically, the back supporter 6 is horizontally turnably coupled to one back supporter stand 17 on upper frame 11 at one end thereof. The other end of the back supporter 6 is coupled detachably to the other back supporter stand 17 on the other upper frame 11 by assistance of a lock sleeve 61. When the lock sleeve 61 rests in its lower position, the back supporter 6 is firmly coupled to both main frames 1 to define the lateral distance between the main frames 1. As the lock sleeve 61 is moved upwards, the back supporter 61 is turnable about the one end so that the other end is detached from the associated rear end of the other upper frame 11.

The foot unit 7 includes a pair of parallel side plates 71 extending forwards from the rear ends of the lower frames of the main frames 1. Each side plate 71 is connected to a foot plate 72 along a side hinge 74 extending in the longitudinal direction. The two side plates 72 are connected to each other along a center hinge 72 extending in parallel to the side hinges 74. A transverse lock arm 75 is pivoted at one end to one side plate The other end of the lock arm 75 is detachably fixed to the other side plate 71 by assistance of a lock handle 76 and a lock hole 77 formed in the other side plate 71. When the lock arm 75 rests in its rest position, it holds the footplates 72 in a flat state. As the lock arm 72 is swung to its open position as shown In FIG. 3, it allows folding of the footplates 72 along the hinges 73 and 74. Small wheels 78 are attached to the undersides of the side plates 71.

Figure 6:
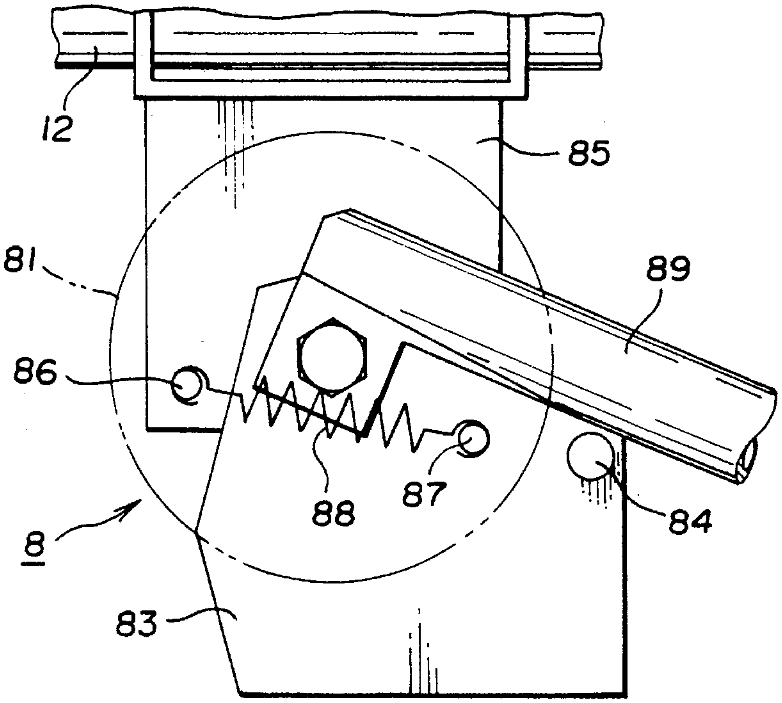
FIG. 6 is an enlarged side view of the caster unit used for the wheelchair shown in FIG. 1.

The caster unit 8 is shown in detail in FIG. 6. The caster unit 8 is fixed to the underside of the rear end of each lower frame 12 of the main frame 1 via a bifurcate caster frame 85 which sandwiches a caster 81. The caster 81 is rotatably mounted on a transverse caster shaft fixedly carried by the bifurcate caster frame 85. In an arrangement to sandwich the caster frame 85, a bifurcate stand 83 is rotatably mounted to the caster shaft 82. A jack lever 89 is also rotatably mounted to the caster shaft 82 with its proximal end being in engagement with the stand 83. A tension spring 88 is interposed between one spring pin 86 fixed on the caster frame 85 and the other spring pin 87 fixed on the stand 83. Usually, the jack lever 89 is swung upwards by operation of the tension spring 88 and the caster 81 rests on the floor, the stand 83 being held above the floor. As the jack lever 89 is manually swung downwards against the operation of the tension spring 88, the stand 83 rests on the floor and the caster 81 is lifted from the floor. The size of the stand 83 is designed so that the large wheel 43 is also lifted from the floor when it rests on the floor. That is, the large wheel 43 is kept in a lifted position suited for detachment from the main frame 1.

The wheelchair operates as follows.

Figure 7:
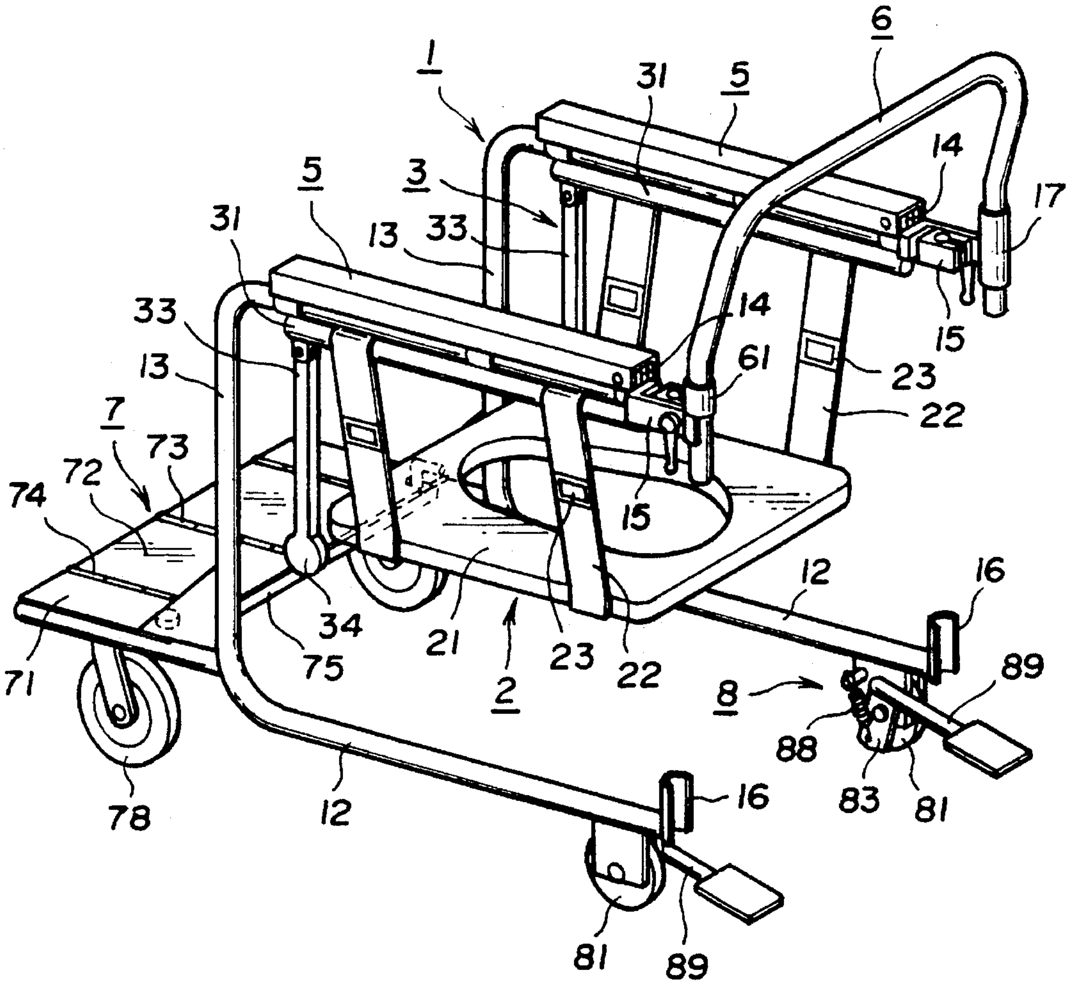
FIG. 7 is a perspective view of the foldable wheelchair in a partly disassembled state.

For transfer of a user from a bed to the wheelchair, the large wheels 43 have to be detached from the main frames 1 first. The jack lever 89 is pushed downwards by a helper in order to lift the large wheel 43 from the floor. Next, by loosening the upper and lower locks 15, 16 on the main frame 1, the rim shaft 41 is detached from the main frame 1 together with the large wheel 43 it holds (see FIG. 7). Then, the jack lever 89 is pushed upwards to let the caster 81 rest on the floor.

The seat plate 21 is detached from the main frames 1 by disengaging the buckles 23 on the four suspension belts 22. The lock sleeve 61 is moved upwards to release the other end of the back supporter 6 which is then swung rearwards to an open position about the back supporter stand 17 holding its other end (the upper side end in FIG. 3). Under this condition, the pair of main frames 1 are able to change their intermediate distance.

The seat plate 21 is inserted below the hip of a user lying on a bed and the upper half of the user's body is raised with the legs extending forward. Next, the body of the user is turned about 90 degrees and the user's legs are made to hang down from the bed while facing the wheelchair.

The wheelchair is then moved towards the bed until the upper frames 11 are located on both sides of the user now sitting on the bed. Nothing hinders this rearward movement of the wheelchair because the rim shafts 41 have already been detached from the main frames 1 and the back supporter 6 has already swung to the open position. The lower frames 12 are now located under the bed. The back supporter 6 is again swung forwards to its closed position to connect the rear ends of the upper frames 11 together. The feet of the user are then placed on the footplates 72.

The armrests 5 are swung upwards about the respective armrest stands 14 and the seat plate 21 is connected to the lifter shafts 31 via the suspension belts 22. The lifter arms 33 are then swung upwards and connected to each other via the end buckles 34. This causes the lifter shafts 31 to turn about the axes of the associated upper frames 11 of the main frame 1. The seat plate 21 is now lifted from the bed whilst carrying the user thereon. This lifting of the user from the bed requires no strong force of the helper because it makes use of leverage operation of the lifter arms 33.

The wheelchair is then moved forwards away from the bed. The lifter arms 33 are disengaged from each other and swung downwards so as to turn the lifter shafts 31. The seat plate 21 is now located at its normal level position which is similar to the height of an ordinary western style toilet basin.

Under this condition of the wheelchair, the user now travels to a toilet by oneself or by assistance of a helper. On arriving at the toilet, the wheelchair can smoothly go through a toilet door of a normal size because the large wheels 43 have already detached from the main frames 1. The seat plate 21 is now located just on a toilet basin because of its adjusted normal level position.

Figure 8:
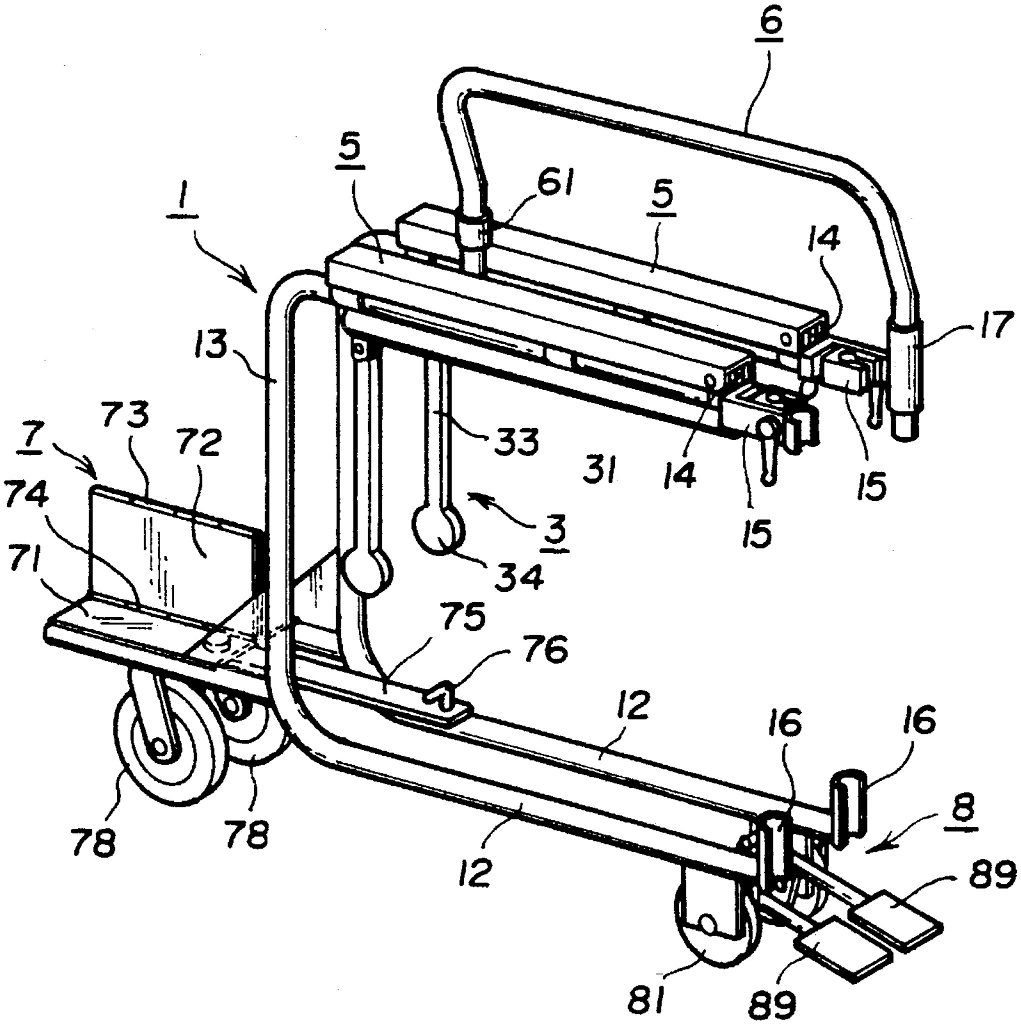
FIG. 8 is a perspective view of the foldable wheelchair in a fully folded state.

Folding of the wheelchair is carried out in the following sequence. First, the lock handle 78 of the foot unit 7 is loosened and the lock arm 75 is swung to its open position away from the footplates 72. Next, the back supporter 8 is unlocked and swung to its open position about the back supporter stand 17 on one of the main frames 1. Finally, the footplates 72 are folded together about the hinges 73 and 74. When wanted, the large wheel units 4 may also be detached as shown in FIG. 8.

Assembly of the wheelchair is carried out in the following sequence. First, the footplates 72 are unfolded about the hinges 73 and 74 to separate the two main frames 1 from each other and the back supporter 6 is swung to its closed position for locked connection with the main frames 1. Next, the lock arm 75 is swung to its closed position to fix the position of the footplates 72 and the jack levers 89 Are pushed down to lift the caster 81 from the floor (see FIG. 7). Finally, the large wheel units 2 are attached to the respective main frames 1 and the jack levers 89 are swung upwards to make the casters 81 and the large wheels 43 descend on the floor.

Showering by a user is carried out in the following sequence. The user travels to a shower room by oneself or by assistance of a helper after detachment of the large wheel unit 4. In an alternative way, the large wheel unit 4 may be detached on arrival at the shower room. Because of the reduced Width of the wheelchair without the large wheel unit 4, the wheelchair can go through a shower room door of a normal size. A simple chair is then placed under the seat plate 21 of the wheelchair and the lifter arms 33 of the lifter unit 3 are swung downwards to make the seat plate 21 descend on the simple chair. The seat plate 21 is then disconnected from the lifter unit and the wheelchair is taken out of the shower room. The user can shower sitting on the simple chair via the seat plate 21.

In accordance with the present invention, a wheelchair can approach very closely to a user lying on a bed thank to the open rear construction of the wheelchair. The wheelchair can go through various doors of normal sizes, in particular of normal widths, thanks to the detachable construction of the large wheel units. The wheelchair can be transported very easily thanks to its foldable construction. Further, use of the leverage operation for the lifter unit necessitates no strong manual force for lifting a user from a bed. Use of the jack lever system operable by foot action simplifies attachment and detachment of the large wheel units.

I claim:

1. A foldable wheelchair comprising a pair of main frames each extending in a longitudinal direction of said wheelchair, a swingable back supporter extending in a lateral direction of said wheelchair to detachably connect said main frames together at rear upper ends there of, a lifter unit including a pair of lifter shafts turnably held by said respective main frames and a pair of lifter arms coupled to said respective lifter shafts to enable manual turning of said lifter shafts, a seat unit including a seat plate detachably suspended to said lifter shafts in an arrangement such that turning of said lifter shafts causes lifting and lowering of said seat plate, a pair of large wheel units each including a large wheel detachably coupled to one said main frame, a foot unit coupled to front lower ends of said main frames and including a pair of footplates united together along a center hinge extending in said longitudinal direction, and a pair of caster units coupled to rear lower ends of said main frames and each including a caster and a jack lever for lifting said caster from a floor.

2. A foldable wheelchair as claimed in claim 1 in which each said main frame is made up of an upper frame, a lower frame and a front frame connecting said upper and lower frames at front ends thereof.

3. A foldable wheelchair as claimed in claim 2 in which each said lifter shaft is coupled in parallel to each said upper frame via at least one boss idly inserted over said upper frame.

4. A foldable wheelchair as claimed in claim 2 in which each said large wheel unit includes a rim shaft detachably coupled at both ends to rear ends of said upper and lower frames, and said large wheel is carried by said rim shaft.

5. A foldable wheelchair as claimed in claim 2 in which said foot unit includes a pair of spaced side plates extending forwards from said front frame, and said footplates are connected to said respective side plates via side hinges.

6. A foldable wheelchair as claimed in claim 2 in which each said caster unit includes a caster frame coupled to said lower frame, said caster is rotatably mounted to said caster frame via a rotatable caster shaft, said jack lever is fixed at a proximal end to said caster shaft and provided near said proximal end with a stand, and a tension spring is interposed between a first pin fixed on said caster frame and a second pin fixed on said stand.

* * * * *